(12) United States Patent  
Avrahami et al.

(10) Patent No.: US 9,113,125 B2  
(45) Date of Patent: Aug. 18, 2015

(54) TECHNIQUES FOR INDEXING VIDEO FILES

(75) Inventors: Daniel Avrahami, Mountain View, CA (US); Jered H. Wikander, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/611,929

(22) Filed: Sep. 12, 2012

(65) Prior Publication Data

US 2014/0072284 A1 Mar. 13, 2014

(51) Int. Cl.
```
H04N 5/76        (2006.01)
H04N 5/77        (2006.01)
H04N 9/82        (2006.01)
H04N 21/422      (2011.01)
H04N 21/4223     (2011.01)
H04N 21/433      (2011.01)
H04N 21/845      (2011.01)
G06F 17/30       (2006.01)
```
(52) U.S. Cl.
CPC ............ *H04N 5/77* (2013.01); *G06F 17/30817* (2013.01); *H04N 9/8205* (2013.01); *H04N 21/4223* (2013.01); *H04N 21/42202* (2013.01); *H04N 21/4334* (2013.01); *H04N 21/8456* (2013.01)

(58) Field of Classification Search
CPC ............. G11C 27/034; G11C 2220/90; G11C 27/105; G11C 27/024; G11C 27/036; H04N 9/8042
USPC ......................................................... 386/241
See application file for complete search history.

(56) References Cited

U.S. PATENT DOCUMENTS

| | | | | |
|---|---|---|---|---|
| 5,828,809 A * | 10/1998 | Chang et al. | ................... | 386/241 |
| 2008/0144893 A1* | 6/2008 | Guo et al. | ..................... | 382/118 |
| 2011/0072037 A1* | 3/2011 | Lotzer | ........................... | 707/769 |
| 2012/0029300 A1* | 2/2012 | Paquet | .......................... | 600/300 |
| 2013/0064426 A1* | 3/2013 | Watkins et al. | ............... | 382/103 |
| 2013/0194235 A1* | 8/2013 | Zanone et al. | ................ | 345/175 |

* cited by examiner

*Primary Examiner* — William Tran  
(74) *Attorney, Agent, or Firm* — Kacvinsky Daisak Bluni PLLC

(57) ABSTRACT

In one embodiment, an apparatus may include a processor circuit and a keyframe indexing module that is operative on the processor circuit to map sensor data from a first sensor to a set of video data, where the sensor data and video data correspond to an event. The keyframe indexing module may be further operative on the processor circuit to identify one or more key portions of the set of sensor data, index the one or more key portions to respective mapped one or more video frames of the video data, and generate a first keyframe index to identify the one or more video frames.

24 Claims, 14 Drawing Sheets

*Video Keyframe Indexing System*
200

*Video Keyframe Indexing System*
*300*

*Video Keyframe Indexing System*
400

TECHNIQUES FOR INDEXING VIDEO FILES

BACKGROUND

The ability to edit video is currently supported by a wide variety of video editor programs. One important aspect of video editing is the ability to identify key frames (instances) in a video and to index those key moments. This provides a convenient basis for a user or viewer to navigate quickly through a video when viewing or editing the video. However, the ability to automatically identify these key frames is difficult, and if performed manually, presents a very laborious process for the user.

Many present day editors provide classification of a video into segments ("scenes") based upon changes in the video stream of the video being edited. For example, a transition between one scene and another may be determined based on the identification of a significant change in the video stream. However, such segmentation of a video into scenes based upon significant changes does not attempt to identify interesting or important moments in a video, which may not necessarily be correlated with the change in the video stream that triggers the delineation of a scene. Consequently, after the editor has segmented the video into multiple scenes, one or more scenes may have multiple interesting moments or none at all.

Other schemes have been proposed in which audio may be used to assist in the identification of key moments in an audio track that may be used to determine keyframes in a video. However, such methods may still be limited in their ability to determine keyframes in a video.

Accordingly, there may be a need for improved techniques and apparatus to solve these and other problems.

DETAILED DESCRIPTION

Various embodiments are directed to enhancing the editing of videos. The term "video" as used herein generally refers to a medium that when executed presents a sequence of images that depict motion. A video may include a digital recording that contains a video track, and may optionally include or be associated with other recorded data, such as an audio track. Consistent with various embodiments, techniques and apparatus are provided that enhance the editing of a video by employing sensor data that is collected in conjunction with the video and is used to assist in identifying and indexing keyframes or key moments in the video. In this manner, an index (keyframe index) may be generated for an edited video that provides a set of keyframes. As used herein, the term "keyframe" generally refers to a portion of video that marks an instance used for navigating through the video or editing the video. The keyframe may represent a frame of video representing an important moment in the video, such as a transition between scenes. The related term "key moment" may refer to a key portion of data recorded by a sensor device, audio device, or video device that may be used to generate a keyframe in the corresponding video. The key portion of data may represent an instance where a large change in data values takes place between successive data points. Once generated, the keyframe index may then be employed by a user to view and/or edit the video in question. For example, a user may select one or more indexed moments for choosing scenes when editing video, or to easily "scrub" (e.g. navigate) to a particular moment in a video when editing or viewing.

As detailed below, consistent with various embodiments, sensor data may be collected by a sensor that is collocated with a video recording device in the same apparatus, such as a video camera. In other embodiments sensor data may be collected by a sensor that is housed in a separate apparatus from that containing the video recording device.

Figure 1:
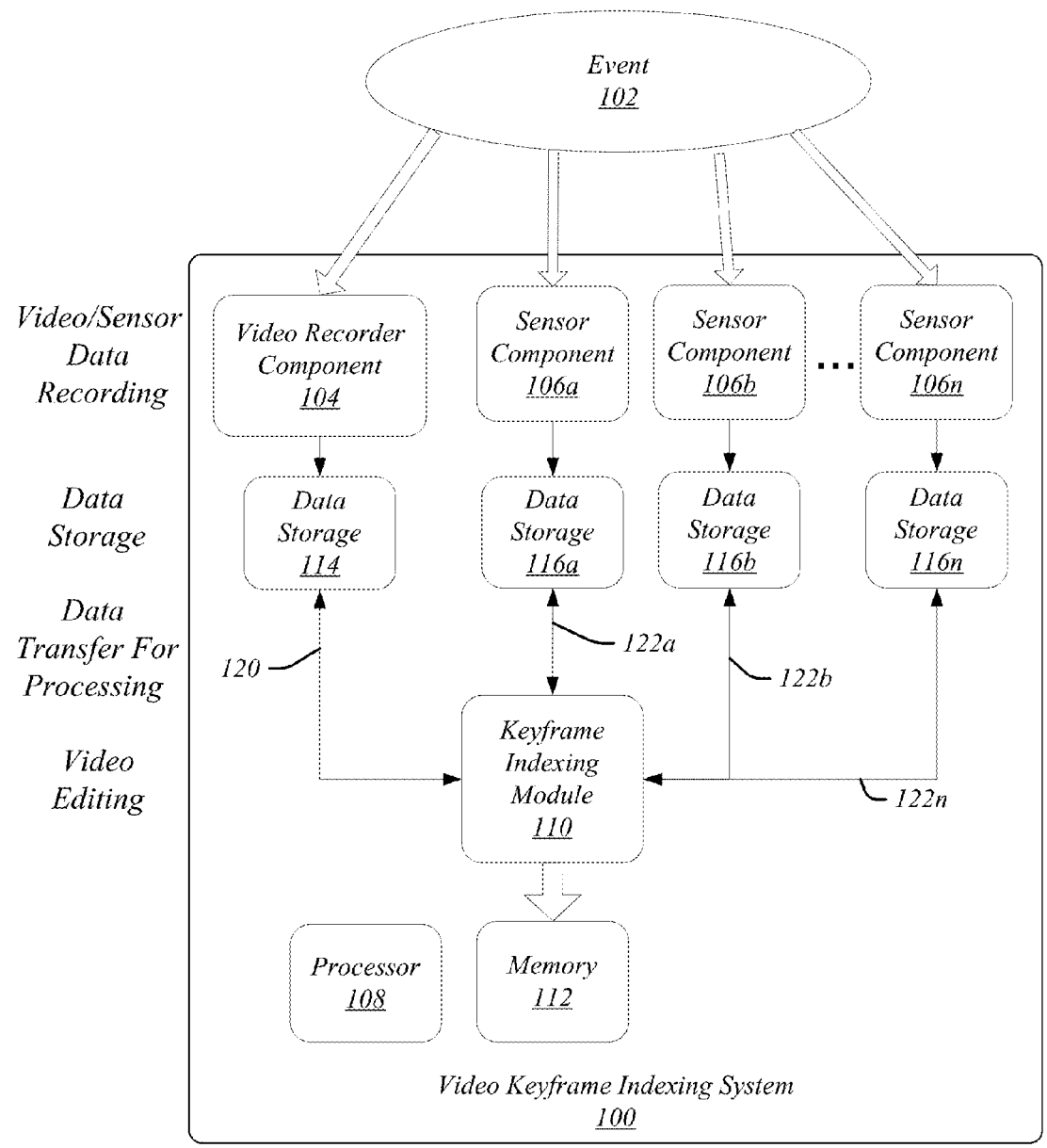
FIG. 1 illustrates a block diagram for an exemplary system.

FIG. 1 illustrates a block diagram for a video keyframe indexing system 100 consistent with the present embodiments. The video keyframe indexing system 100 is generally directed to processing video and other data to enhance editing and viewing of a video. The video keyframe indexing system 100 may organize multiple types of data including video, where the multiple types of data are recorded at a common event, such as event 102 that is depicted in FIG. 1. In various embodiments, in addition to video data, other types of recording devices such as sensors may collect data that can be temporally correlated to a recorded video track for use in identifying portions of the video track that may facilitate editing of the video.

In particular, various functions provided by the video keyframe indexing system 100 are illustrated in FIG. 1 alongside various components that may perform those functions. As illustrated, the video keyframe indexing system 100 supports the recording of video and sensor data, the storage of the recorded data, transfer of data for processing, and the editing of video based on the recorded video and sensor data.

As shown in FIG. 1, the video keyframe indexing system 100 includes a video recording component 104 that may collect and/store video data from the event 102. Examples of a video recording component 104 include a dedicated video camera, a digital camera having video recording capability, a mobile telephone, smartphone, tablet computer, notebook computer, or other computing device having video recording capability. The embodiments are not limited in this context.

The video keyframe indexing system 100 further includes a set of sensor components 106a, 106b, to 106n, where a, b, and n are any positive integer and the number of sensor components in the set is one or more. Examples of sensor components include an accelerometer, a gyrometer, a pressure sensor, a temperature sensor, a light sensor, and a humidity sensor. The embodiments are not limited in this context.

In various embodiments, various components of the video keyframe indexing system 100 may be collocated in a common apparatus or may be located in different apparatus and may be linked through one or more wired communication links, wireless communication links, or a combination of both. When implemented as a set of components that are coupled through wired communication links, for example, the video keyframe indexing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a set of components that are coupled through wireless communication links, for example, the video keyframe indexing system 100 may include wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, video keyframe indexing system 100 includes a processor 108, memory 112, and keyframe indexing module 110 whose operation is detailed below. Generally, the keyframe indexing module 110 is operable to couple at least temporarily to the video recording component 104 and sensor components 106*a*-106*n*. In various embodiments, as shown in FIG. 1, the video recording component 104 and/or sensor components 106*a*-106*n* may store data collected as video data and/or other sensor data, which is subsequently transferred for processing by the keyframe indexing module 110. For example, video data from the event 102 may be collected and stored by a video camera while a separate sensor device collects and stores motion data from the event 102. These sets of data can then be transferred from the data source (shown as data storage) in which the data is stored to a keyframe indexing module 110 for processing. The data storage 114 for data collected from event 102 by video recording component 104 as well as the data storage 116*a*-116*n* for data collected from event 102 by respective sensors 106*a*-106*n* may be any convenient storage medium/device.

Examples of data storages 114, 116*a*-116*n* include a disk drive, a hard drive, an optical disc drive, a universal serial bus (USB) flash drive, a memory card, a secure digital (SD) memory card, a mass storage device, a flash drive, a computer, a gaming console, a compact disc (CD) player, computer-readable or machine-readable memory, wearable computers, portable media players (PMP), portable media recorders (PMR), digital audio devices (e.g., MP3 players), digital media servers and so forth. The embodiments are not limited in this context.

In cases where a video recording component 104 or sensor component 106*a*-106*n* is not initially linked to the respective data storages 114, 116*a*-116*n*, a user may manually connect the video recording component 104 or sensor component 106*a*-106*n* to the respective data storage. As detailed below, in some embodiments, the data storages 114, 116*a*-116*n* may form part of the respective video recording component 104, or sensor component 106*a*-106*n*. In such cases, in order to process video data collected from the event 102, a user may manually couple the video recording component 104/sensor component 106*a*-106*n* to a device that contains the keyframe indexing module 110. As shown in FIG. 1, the coupling of the data storage 114 may take place over the link 120, while the data storages 116*a* to 116*n* are coupled to the keyframe indexing module 110 via respective links 122*a* to 122*n*. In various embodiments, the links 120 and 122*a* to 122*n* may be any combination of wired or wireless links, and may be reversible or permanent links. Although the links 120 and 122*a* to 122*n* are depicted as directly connecting the keyframe indexing module 110 to the respective data storages 114 and 116*a* to 116*n*, the data storages 114 and 116*a* to 116*n* may instead be coupled to memory in a device housing the keyframe indexing module 110.

Thus, in accordance with embodiments generally illustrated in FIG. 1, video data and related sensor data (not separately shown) may be collected from an event 102 by the video recorder component 104 and sensor component(s) 106*a*-106*n*, each of which components may initially store their respective video data and sensor data in specific embodiments. The collected video data and sensor data may optionally be stored in the data storages 114 and/or 116*a*-116*n*, which may represent portable storage devices. Subsequently, the collected video data and sensor data may be transferred for processing by the keyframe indexing module 110, either directly to the keyframe indexing module 110, or to a memory such as the memory 112, from which the keyframe indexing module may retrieve the desired data.

As illustrated in FIG. 1, the video keyframe indexing system 100 may include a processor circuit, or "processor" 108 that is employed by the keyframe indexing module to execute processing operations or logic for performing such operations as editing a video. The processor 106 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some examples, and as detailed with respect to the figures to follow, the video keyframe indexing system 100 may perform, among other tasks, the operations to collect video and sensor data that are to be correlated, to store the video and sensor data, analyze the sensor data, and to generate a keyframe index for the video. Consistent with the present embodiments, the keyframe index thus generated may provide a better index for editing and otherwise processing a recorded video that that provided by conventional video editing schemes. A video and keyframe index for that video may be subsequently stored in a memory, such as the memory 112.

Figure 2:
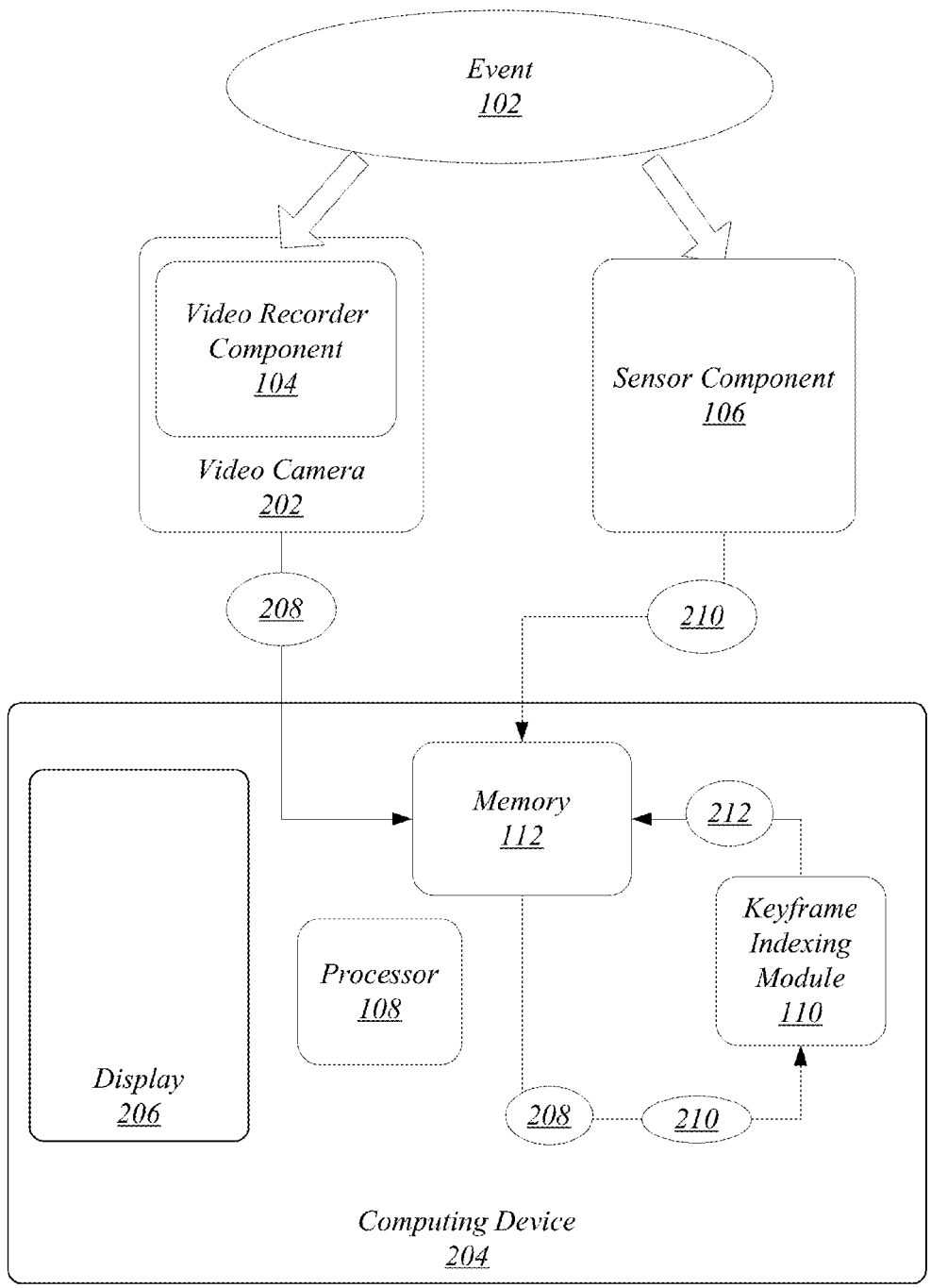
FIG. 2 illustrates operation of a first exemplary system.

FIG. 2 illustrates a block diagram for a video keyframe indexing system 200 consistent with the various embodiments. In this example, the keyframe indexing system 200 includes multiple separate apparatus in which one apparatus houses a video recorder component 104 and at least one additional apparatus houses a sensor component 106. Notably, for simplicity, in the examples to follow, a single sensor component 106 is depicted (without a separate housing shown), which may represent one or more sensor components 106a-106n unless otherwise noted. In the arrangement of FIG. 2, the videocamera 202 and sensor component 106 may be independently deployed to record an event 102. For example, video of the event may be recorded by a user of the videocamera 202 while the sensor component 106 is independently positioned to record the event 102. In this manner, video data and sensor data may be independently collected at the same time to capture the event 102. For example, and as discussed in depth below, the videocamera 202 may record a video that shows objects and/or people in motion, while a motion sensor device (which may include an accelerometer and/or gyrometer components) or set of devices is deployed on or within an object or objects being recorded by the videocamera 202.

As further illustrated in FIG. 2, the video keyframe index system 200 includes a computing device 204, which may be a mainframe computer, desktop computer, laptop computer, notebook computer, tablet computer, smartphone, or other computer or hybrid communication/computing device. The embodiments are not limited in this context. The computing device 204 is arranged to receive the video data 208 and sensor data 210 recorded by the respective videocamera 202 and sensor component 106. In this embodiment, the computing device 204 includes the keyframe indexing module 110, processor 108 and memory 112. As discussed above, the keyframe indexing module 110 may correlate the video data 208 and sensor data 210, analyze the sensor data 210, and generate a keyframe index 212 that may be stored for use by an editor (user) of the video. In particular, the keyframe indexing module 110 may map the sensor data 210 from a first sensor to video data 208, which may involve temporally aligning the sensor 210 data and video data 208. The keyframe indexing module 110 may identify one or more key portions of the sensor data 210 as detailed below, and index the one or more key portions to respective mapped one or more video frames. From this indexing, the keyframe indexing module 110 may generate a first keyframe index that identifies the one or more video frames as detailed below.

In particular, the video data 208 may be collected as a video stream (video track) that is analyzed by the keyframe indexing module 110 to temporally align video frames of the video data 208 with corresponding portions of the sensor data 210. Thus, the keyframe indexing module 110 may generate time stamps or other indicia that map portions of the sensor data 210 to instances or frames of the video data 208. In this manner, one or more portions of the sensor data 210 may be correlated with a corresponding data frame of the video data 208. Once the sensor data 210 and video data 208 are temporally aligned, the keyframe indexing module 110 may analyze the sensor data 210 to determine changes in the sensor data that may serve to identify keyframes.

In some embodiments, a machine learning classifier may be used to analyze the data and identify a signature for a key moment. In various embodiments, the key moments may correspond to instances where a fractional change or a rate of change in sensor data exceeds a threshold, or where a sign in sensor data is reversed, that is, a switch from positive to negative values, or vice versa.

For example, large changes in sensor values between successive portions of data of the sensor data 210 may be used to identify an event that is to trigger a keyframe. Based upon the temporal alignment of the video data 208 and sensor data 210, the keyframe indexing module 110, may, for example, map one or more points of sensor data that reflect the large changes in data values to a corresponding frame or frames of the video data. When the change in data values exceeds a threshold such as 10 percent, 20 percent, 50 percent or any predetermined threshold, the keyframe indexing module 110 may flag the video frame that corresponds to the instance when the threshold is exceeded. This video frame may then be flagged by the keyframe indexing module 110 and stored as a keyframe in a keyframe index.

The treatment of video and sensor data from the time it is recorded to the time that a keyframe index is generated may differ according to different embodiments. In the example illustrated in FIG. 2, the sensor data 210 and video data 208 is stored in memory 112 of the computing device 204, and subsequently retrieved by the keyframe indexing module 110 for processing to generate the keyframe index 212, which may then also be stored in the memory 112. However, embodiments are possible in which the video data 208 and/or sensor data 210 are directly retrieved by the computing device 204 from the videocamera 202 and/or sensor component 106 and processed by the keyframe indexing module 110 without first being stored in memory 110. For example, the keyframe indexing module 110 may be embedded in a video editing application or program that is configured to allow a user to retrieve and process a video track and sensor data from devices such as video cameras and sensor components that can be reversibly coupled to the computing device 204.

In accordance with the arrangement of video keyframe indexing system 200, a user or group of users may thus collect video data 208 and sensor data 210 generated at an event 102, and transfer the video data 208 and sensor data 210 at their convenience to a computing device 204 for subsequent editing of a video track. Before, or at the time a video is to be edited, the keyframe indexing module 110 may be launched, the video data 208 and sensor data 210 processed, and a keyframe index 212 generated. The keyframe index may then be used to facilitate viewing/editing of the video as desired.

Figure 3:
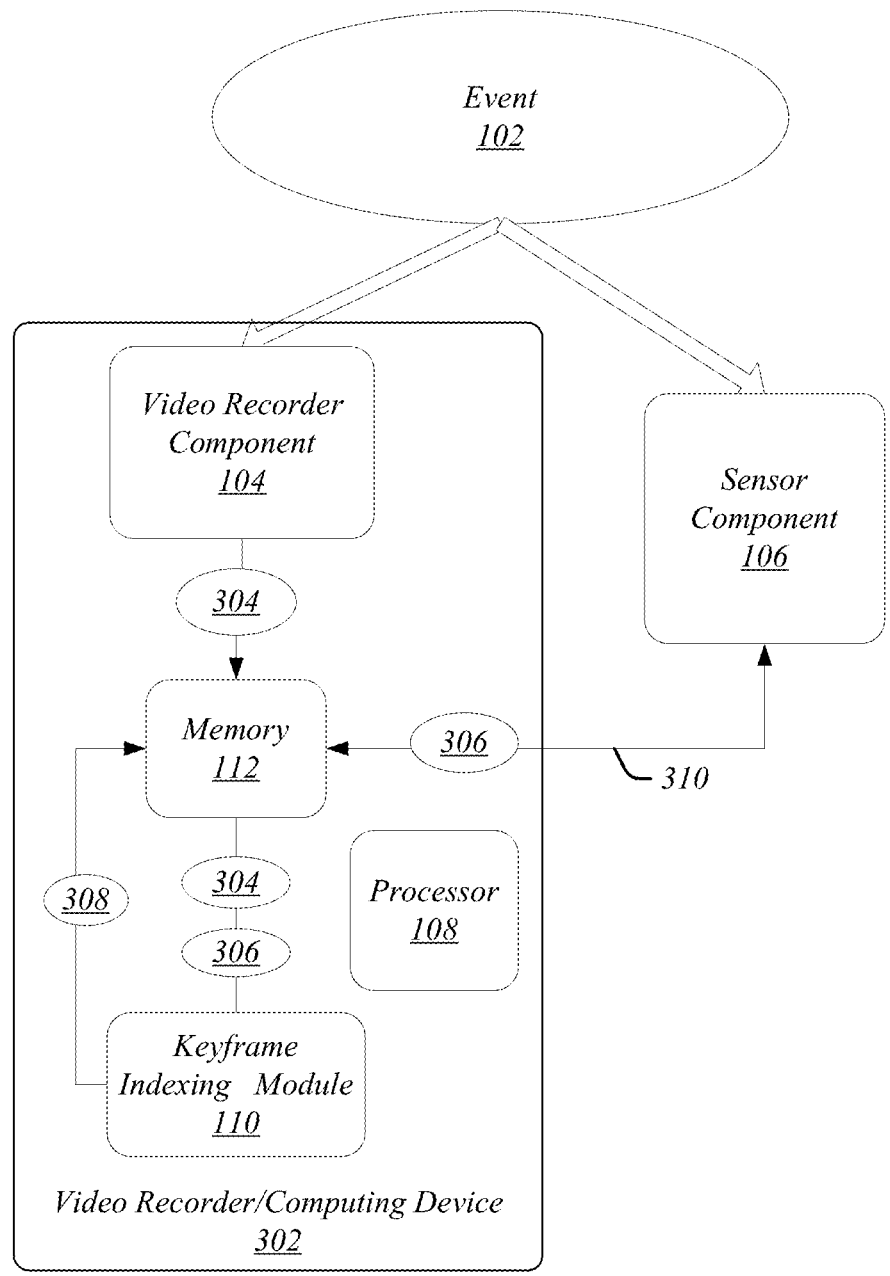
FIG. 3 illustrates operation of a second exemplary system.

FIG. 3 illustrates a keyframe indexing system 300 according to another embodiment. As illustrated, the keyframe indexing system 300 includes a video recorder component 104 that is housed in a separate apparatus than that of the sensor component 106. In particular, the video recorder component 104 is located in a video recorder/computing device 302. The video recorder computing device may be, for example, a portable device such as a tablet computer, notebook computer, or other device that includes video recording capability. In this case, the video recorder/computing device 302 includes the keyframe indexing module 110, processor 108, and memory 112, that facilitate generating a keyframe index for a video that is recorded by the video recorder/computing device.

In some embodiments, a first user may employ the video camera/computing device 302 to record video data 304 form the event 102 while sensor data 306 from the event 102 is collected from a separate device sensor component 106, which may be located in a moving object at the event, for example. The video data 304 and sensor data 306 may both be stored within a memory 112 in the video recorder/computing device 302 for use by the keyframe indexing module 110. In one example a user may record the video data 304 from the event 102 in the video recorder/computing device 302, while a sensor component 106 records sensor data 306 separately. The sensor component 106 may be subsequently coupled to the video recorder/computing device 302 via the link 310 in order for the sensor data 306 to be transferred to the video recorder/computing device 302. The link 310 may be any convenient link, such as a wireless RF link, an infrared link, wired connection such as a serial connection including a universal serial bus connection, and so forth.

Once the video data 304 and sensor data 306 are transferred to the video recorder/computing device 302, the video data 304 and sensor data 306 may be stored in the memory 112 for use by the keyframe indexing module 112. In turn, when the keyframe indexing module 112 is in operation, the video data 304 and sensor data 306 may be retrieved and a keyframe index 308 generated based upon an analysis of the video data 304 and sensor data 306 as generally described above with respect to FIG. 2.

Figure 4:
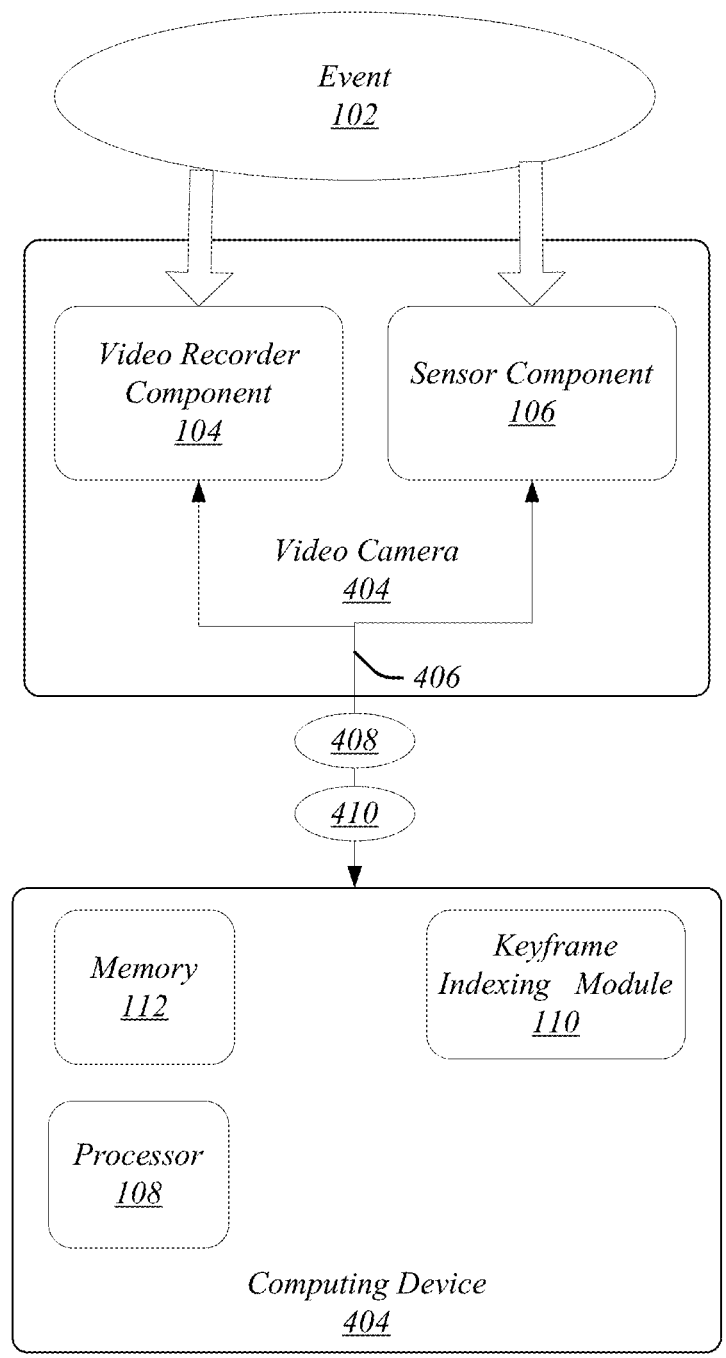
FIG. 4 illustrates operation of a third exemplary system.

In other embodiments, video data and sensor data may be recorded in a single apparatus for later processing to generate a keyframe index. FIG. 4 illustrates one embodiment of a video keyframe indexing system 400 in which a video camera 402 includes a video recorder component 104 and sensor component 106. In one instance the sensor component 106 may be an accelerometer or combination of accelerometer and gyrometer. Such sensor components 106 are frequently deployed in present day mobile devices including cameras, smartphones, tablet computers, and the like. Accordingly, in some embodiments, the sensor component 106 may be a component that detects motion in the video camera. In one example, if the video camera 402 is deployed in an event in which the video camera 402 undergoes motion while recording video, the motion of the video camera itself may be captured by the sensor component 106 while the video recording component 104 is recording video. In one example, video data and sensor data are captured and stored by the video camera 402 in a memory of the video camera 402 (not shown).

The video and sensor data that is recorded from event 102 and stored in the video camera 402 may subsequently be transferred to a computer or other device for editing the video, as illustrated in FIG. 4. As shown therein, the video keyframe indexing system 400 includes a computing device 404 that houses the keyframe indexing module 110, processor 108 and memory 112 described previously. The computing device 404 may be, for example, any general purpose computer such as a desktop or laptop computer, notebook computer, tablet computer, hybrid computer/communications device, or other device suitable for editing programs or content including video. When the user has recorded and stored video data and sensor data in the video camera 402, the user may subsequently wish to edit the video. Accordingly, the user may couple the video camera 402 to the computing device 404 to transfer the video data and sensor data for analysis to facilitate the video editing. As shown in FIG. 4, the video camera 402 may be coupled to the computing device 404 via the link 406, which may be a wired or wireless connection in different embodiments. The video data 408 and sensor data 406 may then be transferred to the computing device 404 for generating a keyframe index for the video recorded from the event 102, as generally described above with respect to FIGS. 1-3.

Figure 5A:
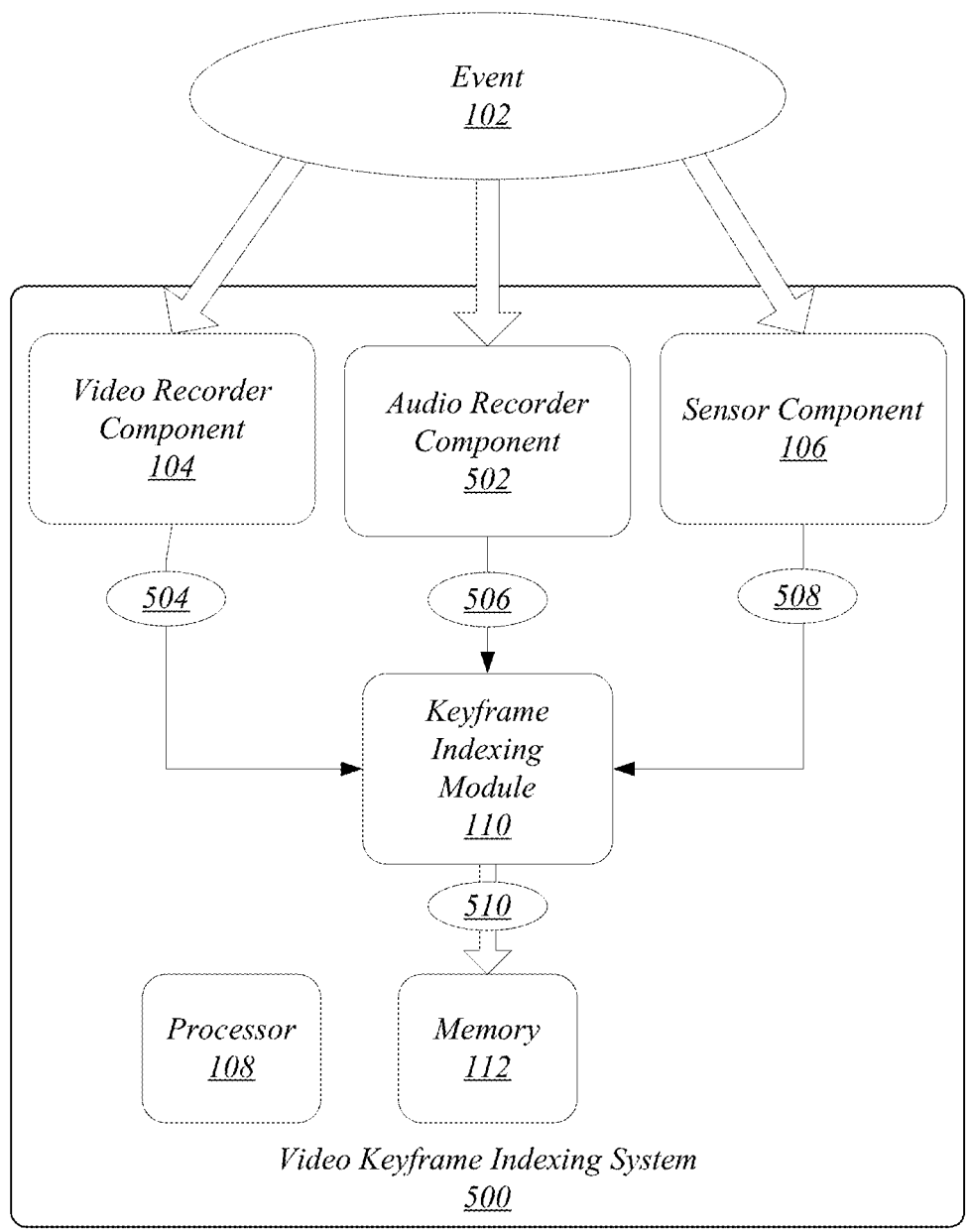
FIG. 5a illustrates operation of a fourth exemplary system.

In further embodiments, video data and sensor data may be combined with audio data to generate a keyframe index for recorded video. FIG. 5a depicts a block diagram for a video keyframe indexing system 500 consistent with the additional embodiments. In the arrangement illustrated, an event 102 generates signals that are captured by a video recorder component 104, sensor component 106, and an audio recorder component 502. In different embodiments, the video keyframe indexing system 500 may be further arranged as generally illustrated in FIGS. 2-4, for example. Thus, in some embodiments, the video recorder component 104, sensor component 106, and an audio recorder component 502 may be collocated in a single apparatus that is separate from an apparatus containing the keyframe indexing module 110. In other embodiments, the video recorder component 104 and audio recorder component 502 are housed in a common apparatus while the sensor component 106 is housed in different apparatus that of the video recorder component 104 and audio recorder component 502.

In various embodiments, each of the video recorder components 104, sensor component 106, and audio recorder component 502 may record data from an event 102. For example, in one embodiment a videocamera (not shown) houses a microphone (audio recording component 502) and video recording component 104, which are used to record video and audio from the event. A separate sensor component 106 may record motion data while the audio and video are being recorded by the respective audio recorder component 502 and video recorder component 104. Subsequently, video data 504, audio data 506, and sensor data 508 are sent to the keyframe indexing module 110, which may be housed in a computer, for example, for processing.

Consistent with the present embodiments, the keyframe indexing module 110 may temporally align the video data 504, audio data 506, and sensor data 508. In one example, frames of at least a portion of a video track that contains the video data 504 are mapped to portions of the audio data 506 and sensor data 508. In this way, each of multiple video frames may be correlated with a corresponding portion of the audio data 506 and sensor data 508. Subsequently, the keyframe indexing module 110 may analyze the sensor data 508 and audio data 506 to flag portions of either set of data that are deemed to represent a change that is substantial enough to constitute a key moment. The video data 504 is then interrogated to determine the data frames corresponding to the key moments identified in the audio data 506 and/or sensor data 508. These data frames may then be designated as keyframes, and may be collected and stored as a keyframe index for the video data 504.

In various different embodiments, a keyframe index may be generated by applying different procedures or algorithms for combining key moments that are established for the respective audio data 506 and sensor data 508. For example, in one variant, the keyframe indexing module 110 may initially determine a set of key moments in sensor data 508. This may be based, for example, on identifying instances of substantial changes in a measured sensor data value, for example. In one specific example, a key portion or moment for sensor data 508 is identified when the value of sensor data 508 vs. time or rate of change of the value of sensor data 508 vs. time in a first interval deviates by more than 20% from the value of sensor data 508 value vs. time or rate of change of sensor data 508 value vs. time in an immediately prior interval.

Once the set of key moments for the sensor data 508 is determined, the keyframe indexing module 110 may subsequently analyze the audio data 506 in a similar fashion to that employed to determine key moments in the audio data 506. Once a set of audio data key moments is determined, the keyframe indexing module 110 may analyze the audio data key moments in conjunction with the sensor data key moments to better determine a set of key moments from which to generate a keyframe index. In some cases, the "master" set of key moments determined after analyzing the sensor data key moments in conjunction with the audio data key moments may have fewer entries that the set of sensor data key moments, while in other cases the master set of key moments may have a greater number of entries than that determined from the sensor data key moments alone. Once the master set of key moments is generated, the keyframe indexing module 110 may map this master set of key moments to the corresponding video frames of the video data to generate a keyframe index.

Figure 5B:
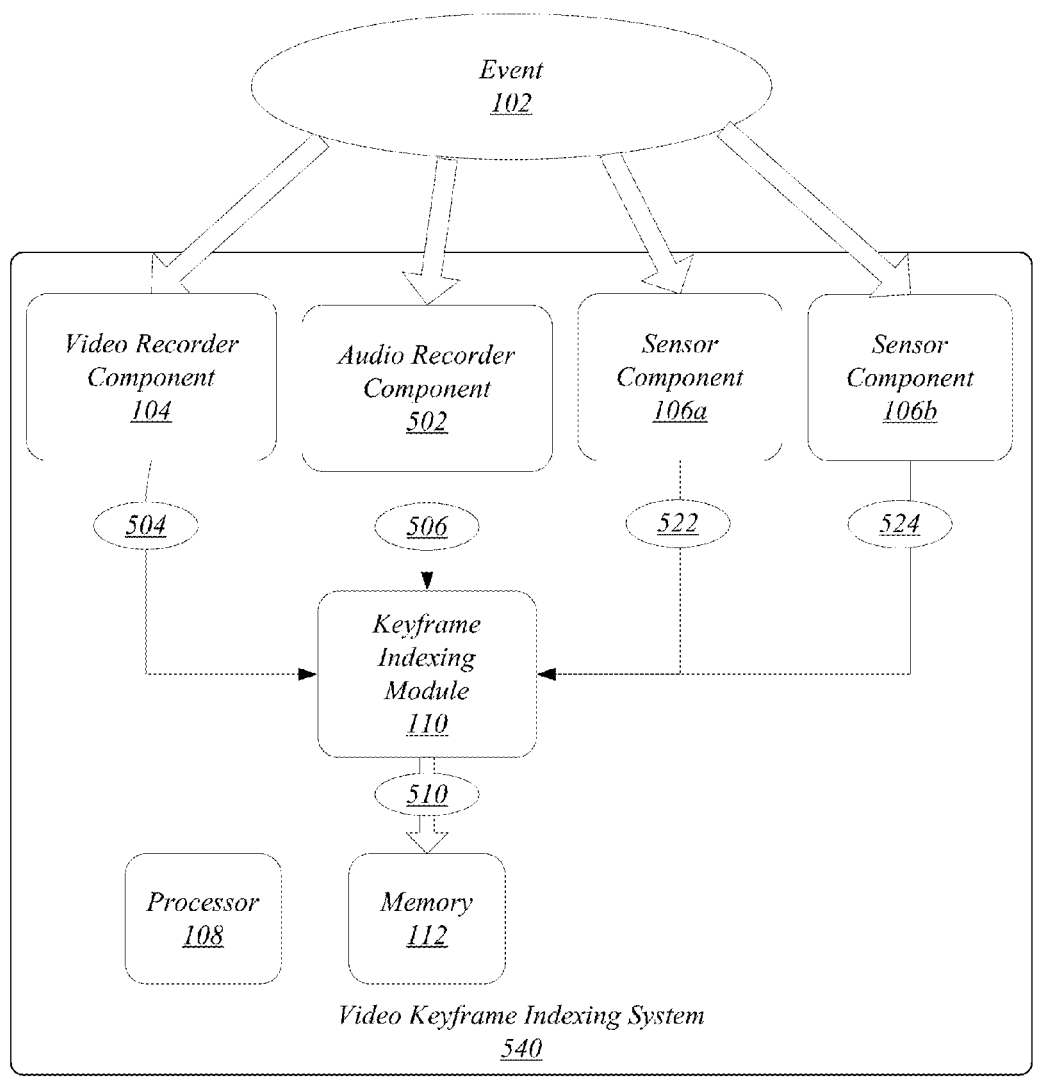
FIG. 5b illustrates operation of a fifth exemplary system.

FIG. 5b depicts a block diagram for an additional video keyframe indexing system 520 consistent with additional embodiments. In this case the video keyframe indexing system 520 is similar to that of FIG. 5a, except that two sensor components 106a and 106b are coupled to the keyframe indexing module 110 for the purposes of providing respective sensor data 522 and 524. The keyframe indexing module 110 may thereby treat the audio data 506, sensor data 522 and sensor data 524 in concert in order to determine a set of key moments from which a keyframe index is generated.

Figure 5C:
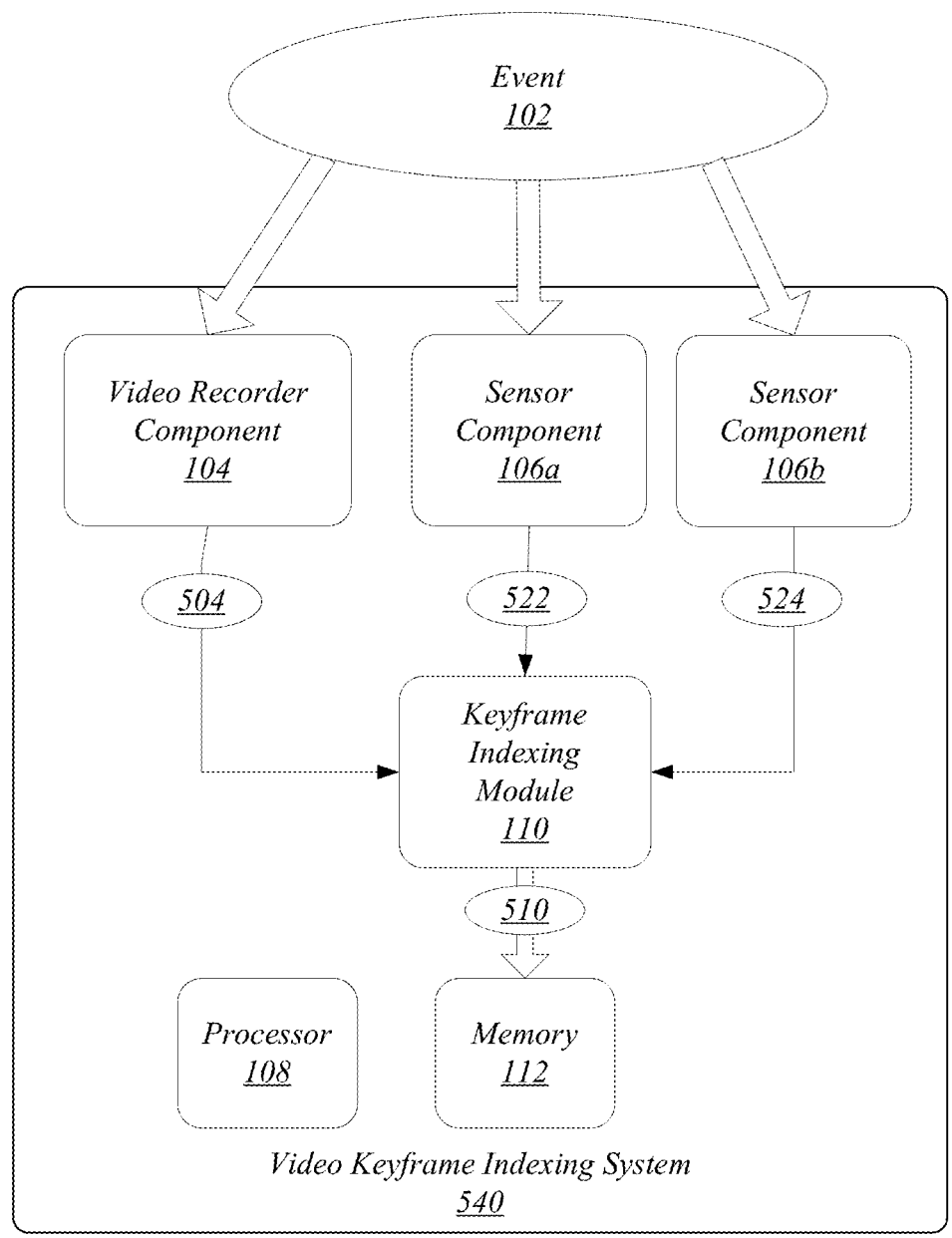
FIG. 5c illustrates operation of a sixth exemplary system.

FIG. 5c depicts a block diagram for still another video keyframe indexing system 540 consistent with additional embodiments. In this case the video keyframe indexing system 520 is similar to that of FIGS. 5a and 5b except that two sensor components 106a and 106b are coupled to the keyframe indexing module 110 for the purposes of providing respective sensor data 522 and 524 and the audio recorder component in omitted. The keyframe indexing module 110 may thereby treat sensor data 522 and sensor data 524 in concert in order to determine a set of key moments from which a keyframe index is generated.

Figure 6:
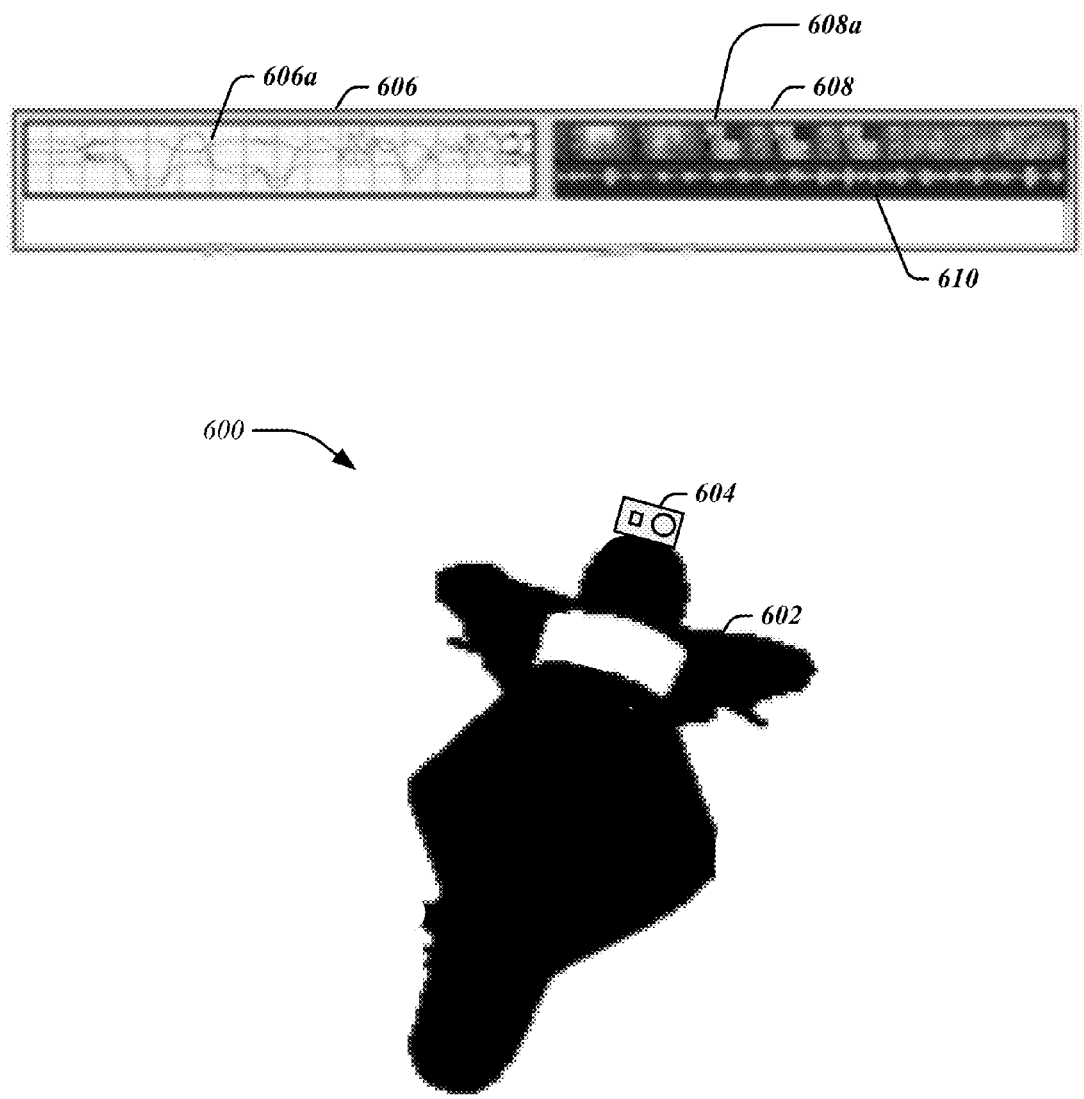
FIG. 6 depicts one use scenario consistent with various embodiments.
Figure 7:
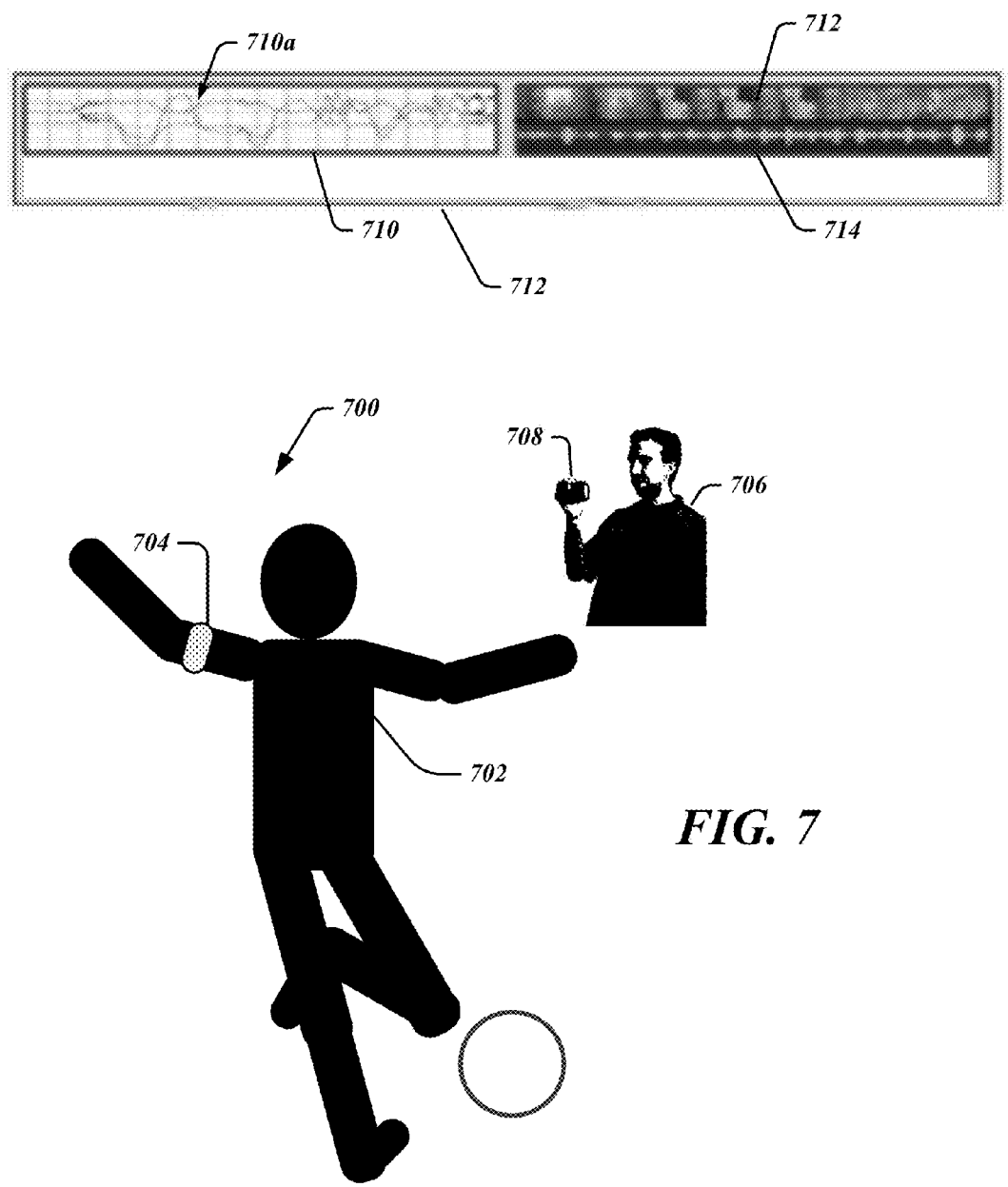
FIG. 7 depicts another use scenario consistent with various embodiments.
Figure 8:
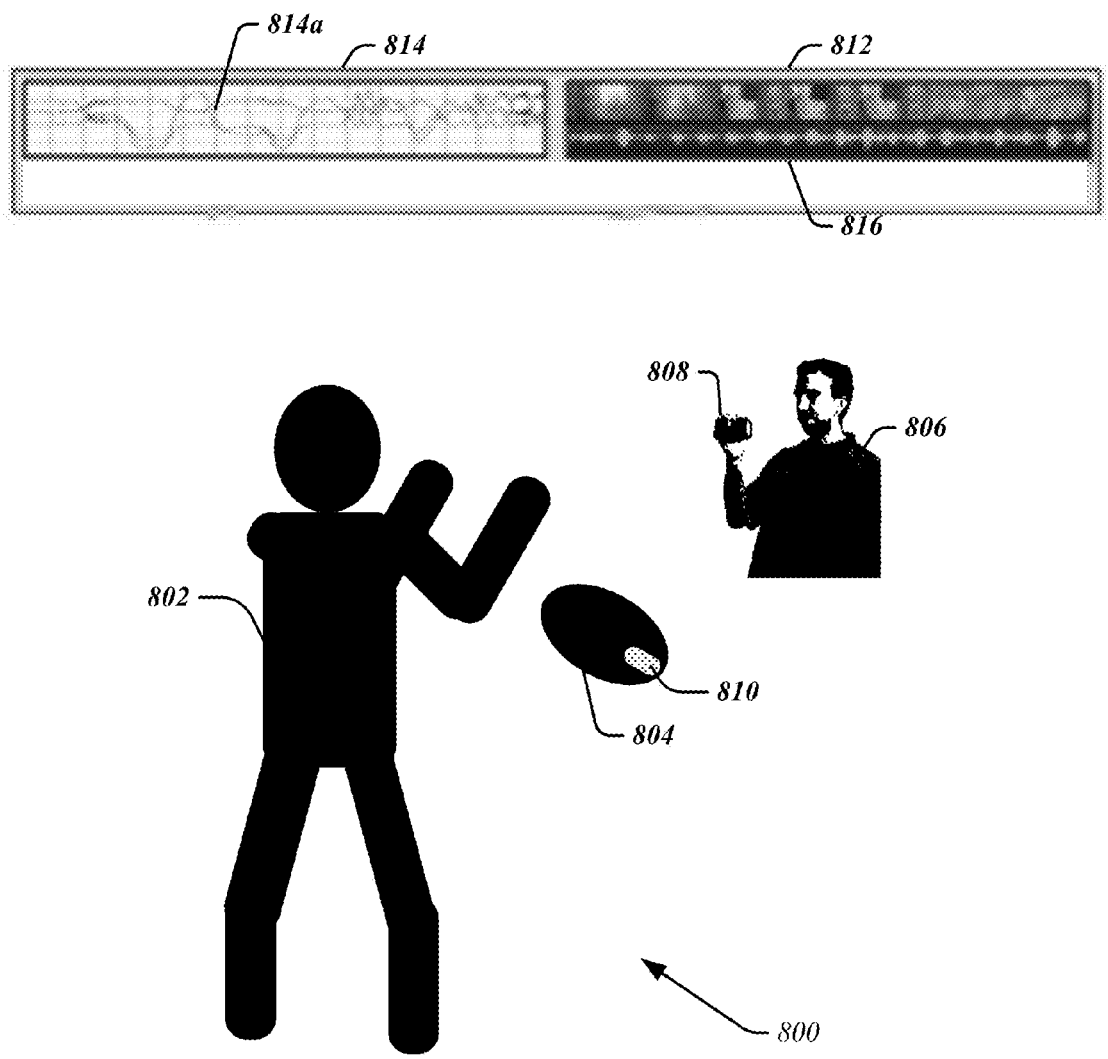
FIG. 8 depicts a further use scenario consistent with various embodiments.

To further elucidate aspects of the present embodiments, FIGS. 6-8 depict different use scenarios for generating a keyframe index for video. In the various use scenarios depicted in FIGS. 6-8, video data and sensor data are recorded at a common event, either using a single apparatus or multiple apparatus. At least an interval of the video data and sensor data overlap in time so that the video data and sensor data can be temporally aligned over the interval in which both video and sensor data is recorded. In particular, FIG. 6 depicts a use scenario in which an event 600 is recorded by an apparatus that houses a video recording device, audio recording device, and motion sensor, which may be an accelerometer. In the example illustrated, the event 600 constitutes a motorcycle ride. The rider 602 is equipped with a head-mounted video camera 604 that includes both a microphone and accelerometer (none of which are separately depicted). During the motorcycle ride, video is recorded from the rider's perspective that may capture the road or path traveled by the motorcycle as well as surroundings and obstacles that are encountered. FIG. 6 illustrates an example of video data 608 that may be stored from the event recorded by the head-mounted video camera 604. In addition, an audio track may be recorded and saved as audio data 610 to accompany the video data 608. Finally, accelerometer data 606 is collected, which may be used by a keyframe indexing module to automatically identify keyframes of the video, such as jumps or landings that are performed by the rider 602. Notably, the jumps or landings may engender significant changes in data values recorded by the accelerometer, which may be used by the keyframe indexing module to identify keyframes of the video. In particular, the accelerometer readings during the beginning and end of a jump may show a significant change in values in one direction, thus triggering the keyframe indexing module to classify the corresponding video frames as keyframes. FIG. 6 shows one example of a point 606a in the accelerometer data where large changes in data take place as a function of time, which may lead to the determination that point 606a is a key moment of the accelerometer data. The key moment represented by point 606a may be used to map to a corresponding point 608a in the video data 608, which may be flagged as a keyframe for the keyframe index. Subsequently, when viewing or editing the video, the user may use the indexed keyframes to quickly identify and jump to interesting moments in the video.

FIG. 7 depicts another use scenario in which video (and optionally audio) from an event 700 is recorded by a video recording device while a sensor is deployed in a separate apparatus. In the scenario of FIG. 7, the event 700 being recorded is a soccer game. As shown therein a user 706 may record the soccer game using a videocamera 708. FIG. 7 depicts an example of the video data 712 recorded from the soccer game. In addition, an audio track may be recorded and saved as audio data 714 to accompany the video data 712. As particularly illustrated in FIG. 7, a player 702, who may be the child of the user 706, is the focus of the videocamera 708. In order to enhance the enjoyment of video data 712 recorded by the videocamera 708, sensor data may be used to aid in generating a keyframe index. In the example of FIG. 7, the player 702 wears a sensor device, such as a motion sensor 704. An example of data that may be recorded by the motion sensor 704 is illustrated as motion sensor data 710 in FIG. 7. When the child has a sudden change in speed or other sudden motion, this may be detected and recorded as a sudden large change in data value(s) by the motion sensor 704. The changes in motion sensor data may subsequently be employed by a keyframe indexing module to flag a key moment in the motion sensor data. An example of a sudden change in motion sensor data is illustrated at point 710a of the motion sensor data 710. By mapping data points such as point 710a to the video data 712, the keyframe indexing module may generate a keyframe of the corresponding video of the soccer game recorded by the videocamera 708. Accordingly, a keyframe index of video recorded at the event 700 may contain one or more keyframes that correspond to significant changes in play or motion of the subject player 702, thereby enabling a user to view or edit the recorded soccer game based upon key events experienced by the player of interest, that is, the user's child (player 702).

FIG. 8 depicts another use scenario in which video (and optionally audio) from an event 800 is recorded by a video recording device while a sensor is deployed in a separate mobile apparatus. In the specific scenario of FIG. 8, an event 800 constitutes a game of touch football. The game may be recorded and saved as video data 812. In addition, an audio track may be recorded and saved as audio data 816 to accompany the video data 812. In the instance shown in FIG. 8 a player 802 is about to catch a football 804, which is recorded by the user 806 via the videocamera 808. Furthermore, the football 804 is equipped with an embedded sensor 810, which may be a type of motion sensor. The embedded sensor 810 may record the motion of the football 804 and store the data as motion data 814. When the player 802 catches the football 804, the embedded sensor 810 may detect a sudden large change in velocity for example. Thus, during the football game, the embedded sensor 810 may detect multiple instances of sudden substantial changes in velocity of the football 804. Such events are recorded in the motion data 814 along with the recorded video data 812. The events where large changes in velocity are detected may be flagged as key moments. FIG. 8 depicts one example of a point 814a in the motion sensor data 814 that may be deemed a key moment due to large changes in data values. This moment and others like it may be used by a keyframe indexing module to generate a keyframe index for the video data 812 of the football game (event 800) recorded by videocamera 808. Such a keyframe index may thereby constitute, among others, multiple instances in which the football is caught, kicked, dropped, or otherwise treated in a manner that generates sudden velocity changes. Accordingly, the keyframe index is likely to exhibit a large number of key moments of the football game, by which editing and viewing of the video is enhanced.

In various additional embodiments a keyframe indexing module may be operative to adjust analysis procedures for identifying key moments or keyframes. For example the keyframe indexing module 110 may be operative to adjust criterion for determining a key moment for sensor data based upon user input for a keyframe index that is generated by the keyframe indexing module 110. In one instance, the keyframe indexing module may apply a threshold criterion to determine when data in a sensor data file is to generate a key moment and a corresponding keyframe. The keyframe indexing module may proceed to automatically generate a keyframe index based on recorded video data and sensor data of an event. However, the user may review the keyframe index generated using the first threshold and manually remove keyframes identified by the keyframe indexing module 110 that are determined not to be keyframes in the estimation of the user. The keyframe indexing module 110 may treat the manual removal of keyframes as an indication of false-positive classification of keyframes, and may adjust criterion for identifying keyframes accordingly. For example, the threshold criterion for sensor changes to trigger a key moment may be increased in order for less key moments and thereby less keyframes to be automatically determined when analyzing a sensor data file. Similarly, manual addition of keyframes, such as in portions of a video where none were found by the keyframe indexing module 100 during its automatic keyframe classification procedure, may be treated as indication of false negative classification. In this latter case, continuing with the example of sensor data, the threshold criterion for sensor changes to trigger a key moment may be decreased in order for more key moments and thereby more keyframes to be automatically determined when analyzing a sensor data file.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
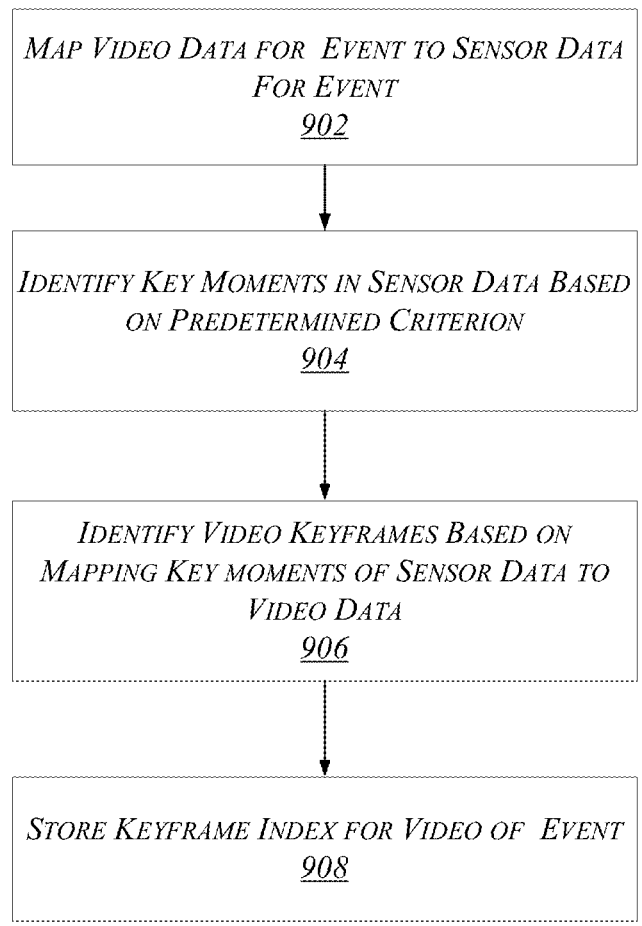
FIG. 9 presents an exemplary first logic flow.

FIG. 9 illustrates an exemplary first logic flow 900. At block 902 video data recorded from an event is mapped to sensor data recorded from the same event. In one example, the video data and sensor data are recorded in a common device such as a video camera equipped with an accelerometer. In other examples, the sensor data is recorded in a sensor that is located in separate device from that housing a video recording device that records the video data.

At block 904, key moments in the sensor data are identified based on a predetermined criterion. In an example, the predetermined criterion is a threshold for changes in successive data values recorded by an accelerometer.

At block 906, one or more video keyframes are identified based upon mapping of the identified key moments of the sensor data to corresponding video frames. At block 908, a keyframe index containing the one or more video keyframes is stored for the video of the event.

Figure 10:
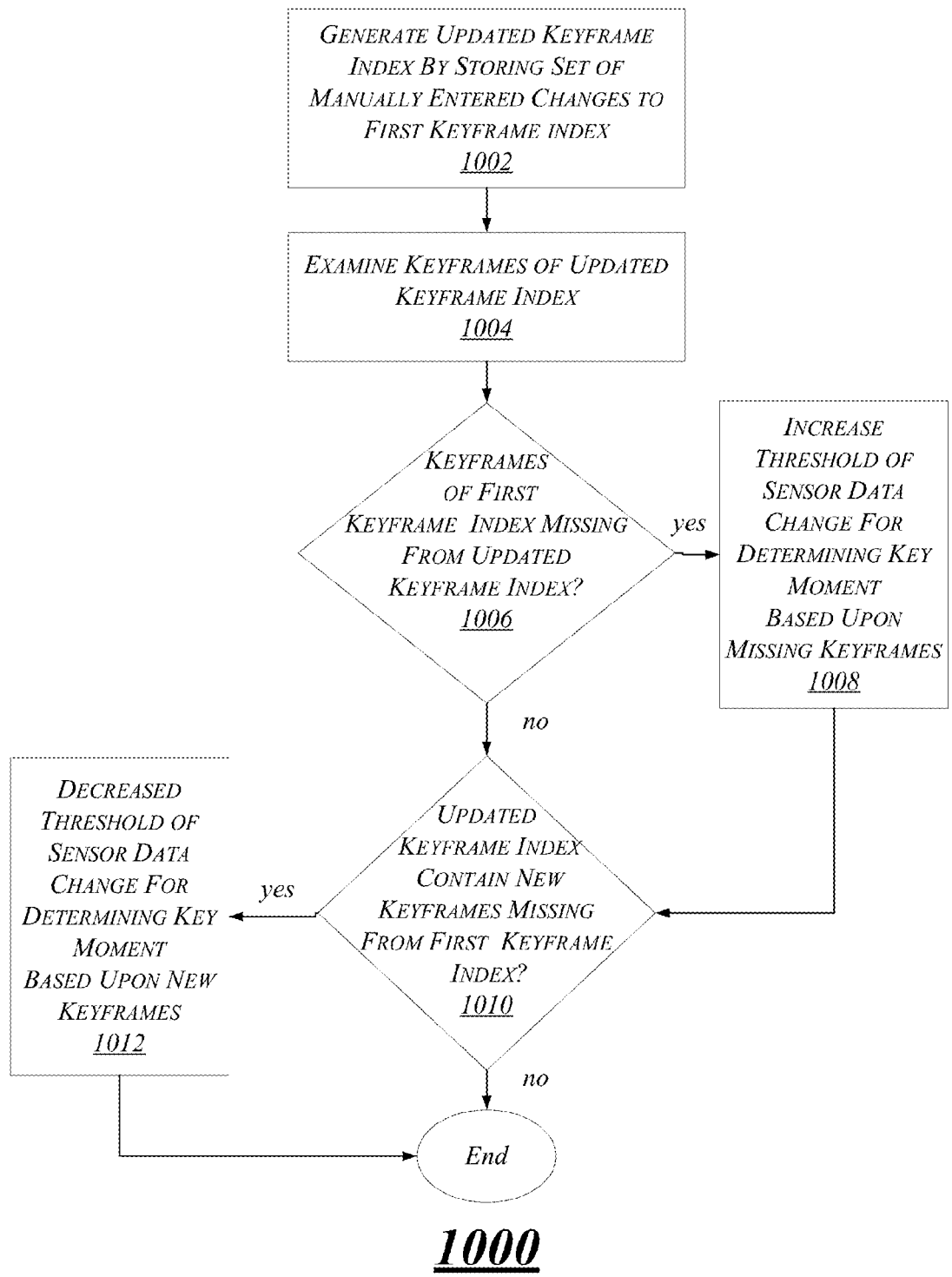
FIG. 10 presents an exemplary second logic flow.

FIG. 10 illustrates an exemplary second logic flow 1000. At block 1002, an updated keyframe index is generated by storing manually entered changes of a first keyframe index. In one example, a user may edit an existing keyframe index that was generated automatically by a keyframe indexing module based upon mapping key moments of sensor data of an event to corresponding video data of the event. The user may add or remove keyframes to the keyframe index based upon the user's judgment. The edited keyframe index may be stored as a new keyframe index.

At block 1004, keyframes of the updated keyframe index are studied to determine if any keyframe changes are present between the original (first) keyframe index and updated keyframe index. In one instance, the updated keyframe index and first keyframe index are retrieved and compared to determine any differences in keyframes.

The logic flow then proceeds to decision block 1006, where a determination is made as to whether any keyframes of the first keyframe index are missing from the updated keyframe index. If so, the flow moves to block 1008. At the block 1008, it is determined based upon the missing keyframes that previous criterion applied to determine key moments in the sensor data are too liberal, thereby resulting in the automatic determination of an excessive number of key moments. Accordingly, the threshold of sensor data change for determining a key moment in the sensor data is increased based upon the missing keyframes. The logic flow then moves to block 1010.

If there are no missing keyframes at block 1006, the flow moves directly to block 1010. At the decision block 1010, a determination is made as to whether the updated keyframe index contains new keyframes that are absent from the first keyframe index. If so, the flow moves to block 1012. At the block 1012, a determination is made that the criteria for determining a key moment in the sensor data are too stringent and thereby fail to identify some key moments such as those corresponding to the new keyframes in the updated keyframe index. Accordingly, the threshold for sensor data change is decreased based upon the new keyframes to increase the likelihood of finding a key moment in sensor data. The flow then proceeds to end.

Figure 11:
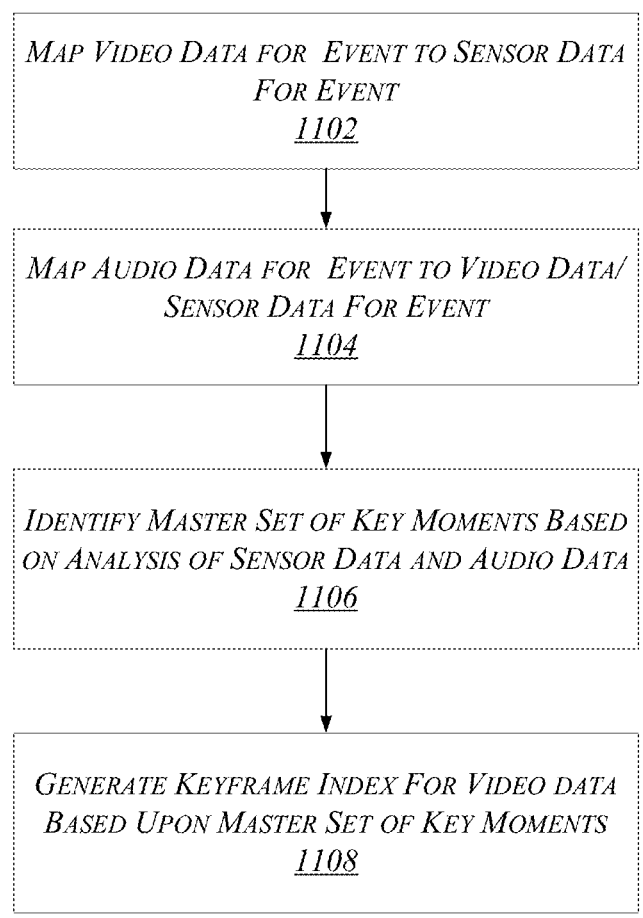
FIG. 11 presents an exemplary third logic flow.

FIG. 11 illustrates another exemplary logic flow 1100. At block 1102, video data recorded for an event is mapped to sensor data recorded for that same event. The mapping may involve providing a time stamp for the video data and/or the sensor data so that a point of data in the video data is correlated to a point of sensor data that occur at the same time.

At block 1104, audio data for the event is mapped to the video data and/or sensor data. In this manner one or more points of audio data are correlated to respective one or more points of video data and/or sensor data that occur at the same time as the respective one or more points of audio data.

At block 1106, a master set of key moments is identified based upon analysis of sensor data and audio data. In one example, the master set of key moments may be a combination of key moments that are independently identified from a set of audio data key moments and sensor data key moments. In another example, the master set of key moments may include key moments that are identified based on examination of changes in both audio and sensor data where the individual audio data change and sensor data change may not otherwise trigger a determination of key moments.

At block 1108, a keyframe index for video data based upon the master set of key moments.

Figure 12:
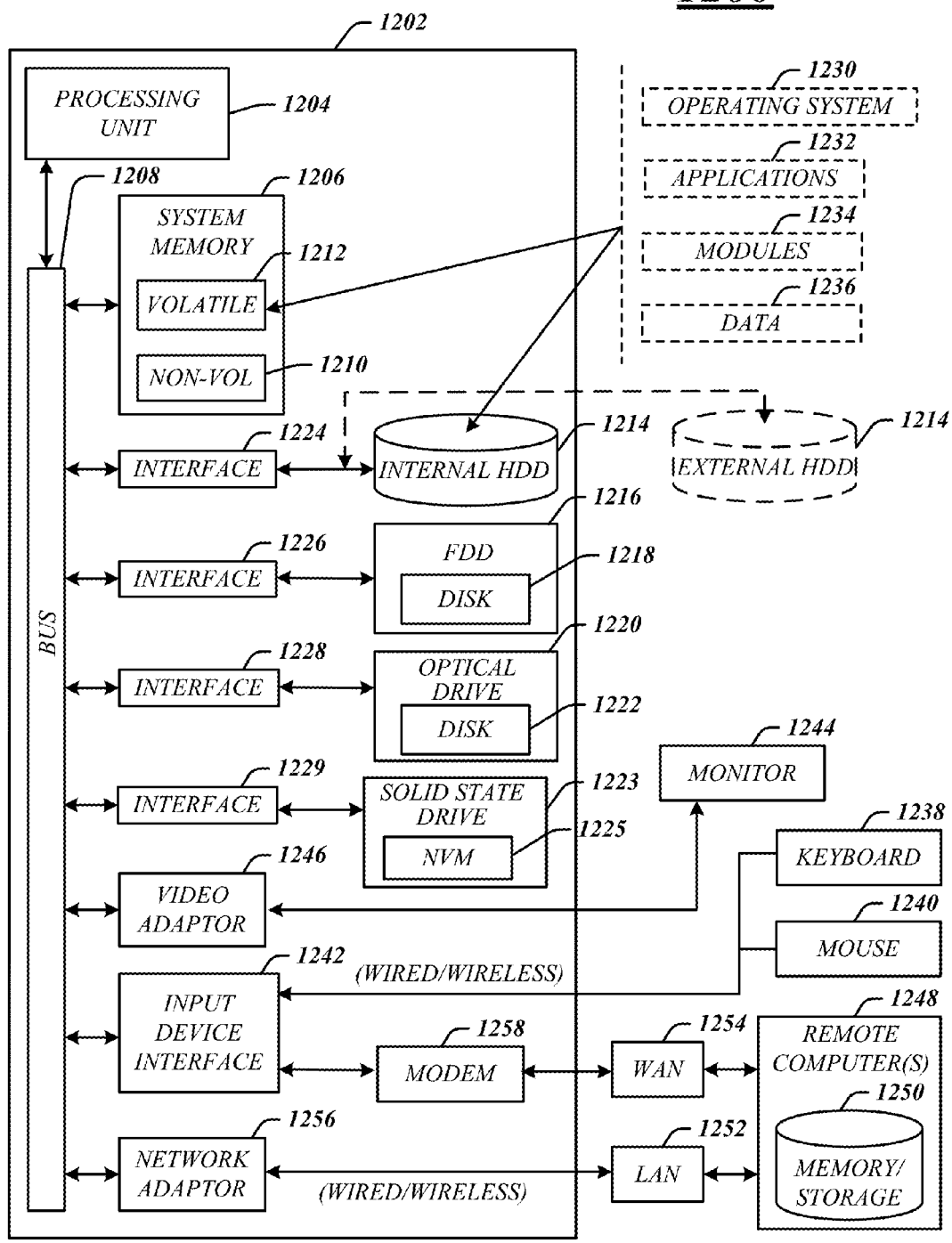
FIG. 12 is a diagram of an exemplary system embodiment.

FIG. 12 illustrates an embodiment of an exemplary computing architecture 1200 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1200 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1200 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors. Dual microprocessors and other multi-processor architectures may also be employed as the processing unit 1204. The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures.

The computing architecture 1200 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236.

A user can enter commands and information into the computer 1202 through one or more wire/wireless input devices, for example, a keyboard 1238 and a pointing device, such as a mouse 1240. Other input devices may include a microphone, an infrared (IR) remote control, a joystick, a game pad, a stylus pen, touch screen, or the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 856.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include a processor circuit and a keyframe indexing module that is operative on the processor circuit to map sensor data from a first sensor to video data, the sensor data and video data corresponding to an event. The keyframe indexing module may be further operative on the processor circuit to identify one or more key portions of the sensor data, index the one or more key portions to respective mapped one or more video frames of the video data, and generate a first keyframe index to identify the one or more video frames.

In a further embodiment, the sensor data may comprise data recorded by an accelerometer, a gyrometer, a pressure sensor, a temperature sensor, a light sensor, or a humidity sensor.

Alternatively, or in addition, in a further embodiment, the keyframe indexing module may be operative on the processor circuit to map audio data to the video data, where the audio data and video data are captured during recording of the event, to identify key portions of the audio data, and to generate a second keyframe index identifying one or more video frames of the video data based on indexing the set of key portions of the audio data to respective mapped video frames of the video data.

Alternatively, or in addition, in a further embodiment the first keyframe index and second keyframe index may comprise the same keyframe index.

Alternatively, or in addition, in a further embodiment, the keyframe indexing module may be operative on the processor circuit to map second sensor data from a second sensor to the video data, the second sensor data and video data captured during recording of the event, to identify key portions of the set of second sensor data; and to generate a third keyframe index identifying one or more video frames of the video data based on indexing the key portions of the set of second sensor data to respective mapped video frames of the video data.

Alternatively, or in addition, in a further embodiment, the keyframe indexing module may be operative on the processor circuit to generate an updated keyframe index by storing a set of manually entered changes to the keyframe index, and to modify a procedure to identify key portions of sensor data captured during recording of a second event according to the manually entered changes.

Alternatively, or in addition, in a further embodiment, the keyframe indexing module may be operative on the processor circuit to identify missing keyframes of the keyframe index, the missing keyframes comprising keyframes of the keyframe index that are not present in the updated keyframe index, and to assign the missing keyframes as false-positive classification errors.

Alternatively, or in addition, in a further embodiment, the keyframe indexing module may be operative on the processor circuit to identify new keyframes of the keyframe index, the new keyframes comprising keyframes of the updated keyframe index that are not present in the keyframe index, and assign the new keyframes as false-negative classification errors.

Alternatively, or in addition, in a further embodiment, the keyframe indexing module may be operative on the processor circuit to identify the set of key portions of the sensor data by monitoring sensor data as a function of time, and by assigning a key portion to sensor data within an interval in which the value of sensor data vs. time or rate of change of the value of sensor data vs. time deviates from the value of sensor data value vs. time or rate of change of sensor data value vs. time in an immediately prior interval by a predetermined threshold.

Alternatively, or in addition, in a further embodiment, the keyframe indexing module may be operative on the processor circuit to identify the key portions of the sensor data by monitoring sensor data as a function of time, and by assigning a key portion to sensor data within an interval in which the value of sensor data vs. time changes sign.

In a father embodiment, a computer implemented method may comprise mapping sensor data from a first sensor to video data, the sensor data and video data corresponding to an event; identifying one or more key portions of the sensor data, indexing the one or more key portions to respective mapped one or more video frames of the video data; and generating a first keyframe index to identify the one or more video frames.

In a further embodiment of the computer implemented method, the sensor data comprising data recorded by an accelerometer, a gyrometer, a pressure sensor, a temperature sensor, a light sensor, or a humidity sensor.

Alternatively, or in addition, in a further embodiment, the computer implemented method may comprise mapping audio data to the video data, the audio data and video data captured during recording of the event, identifying key portions of the audio data, and generating a second keyframe index identifying one or more video frames of the video data based on indexing the set of key portions of the audio data to respective mapped video frames of the video data.

In a further embodiment of the computer implemented method, the first keyframe index and second keyframe index may comprise the same keyframe index.

Alternatively, or in addition, in a further embodiment, the computer implemented method may comprise mapping second sensor data from a second sensor to the video data, the second sensor data and video data captured during recording of the event, identifying key portions of the set of second sensor data, and generating a third keyframe index identifying one or more video frames of the video data based on indexing the key portions of the set of second sensor data to respective mapped video frames of the video data.

Alternatively, or in addition, in a further embodiment, the computer implemented method may comprise generating an updated keyframe index by storing a set of manually entered changes to the keyframe index, and modifying a procedure to identify key portions of sensor data captured during recording of a second event according to the manually entered changes.

Alternatively, or in addition, in a further embodiment, the computer implemented method may comprise identifying missing keyframes of the keyframe index, the missing keyframes comprising keyframes of the keyframe index that are not present in the updated keyframe index, and assigning the missing keyframes as false-positive classification errors.

Alternatively, or in addition, in a further embodiment, the computer implemented method may comprise identifying new keyframes of the keyframe index, the new keyframes comprising keyframes of the updated keyframe index that are not present in the keyframe index, and assigning the new keyframes as false-negative classification errors.

Alternatively, or in addition, in a further embodiment, the computer implemented method may comprise identifying the key portions of the sensor data by: monitoring sensor data as a function of time, and by assigning a key portion to sensor data within an interval in which the value of sensor data vs. time or rate of change of the value of sensor data vs. time deviates from the value of sensor data value vs. time or rate of change of sensor data value vs. time in an immediately prior interval by more than a predetermined threshold.

Alternatively, or in addition, in a further embodiment, the computer implemented method may comprise identifying the key portions of the sensor data by monitoring sensor data as a function of time, and assigning a key portion to sensor data within an interval in which the value of sensor data vs. time changes sign.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a processor circuit; and
   a keyframe indexing module operative on the processor circuit to:
     map first non-audio sensor data from a first sensor to video data, the first non-audio sensor data and video data corresponding to an event;
     identify one or more first key portions of the first non-audio sensor data based on a change in one or more successive data values of the first non-audio sensor data that exceeds a first threshold change value, to identify the one or more first key portions includes:
       monitoring first non-audio sensor data as a function of time; and
       assigning a first key portion to first non-audio sensor data within an interval in which a value of first non-audio sensor data vs. time or rate of change of the value of first non-audio sensor data vs. time deviates from another value of first non-audio sensor data vs. time or rate of change of the other first non-audio sensor data vs. time in an immediately prior interval by the first threshold change value;
     index the one or more first key portions to respective mapped one or more first video frames of the video data;
     generate a first keyframe index to identify the one or more first video frames;
     map second non-audio sensor data from a second sensor to the video data, the second non-audio sensor data corresponding to the event;
     identify one or more second key portions of the second non-audio sensor data based on a change in one or more successive data values of the second non-audio sensor data that exceeds a second threshold change value, to identify the one or more second key portions includes:
       monitoring second non-audio sensor data as a function of time; and
       assigning a second key portion to second non-audio sensor data within an interval in which a value of second non-audio sensor data vs. time or rate of change of the value of second non-audio sensor data vs. time deviates from another value of second non-audio sensor data vs. time or rate of change of the other second non-audio sensor data vs. time in an immediately prior interval by the second threshold change value;
     index the one or more second key portions of the second non-sensor data to respective mapped one or more second video frames of the video data; and
     generate a second keyframe index to identify the one or more second video frames.

2. The apparatus of claim 1, the first or second non-audio sensor data comprising data recorded by an accelerometer, a gyrometer, a pressure sensor, a temperature sensor, a light sensor, or a humidity sensor.

3. The apparatus of claim 1, the keyframe indexing module operative on the processor circuit to:
   map audio data to the video data, the audio data and video data captured during recording of the event;
   identify key portions of the audio data; and
   generate a third keyframe index identifying one or more video frames of the video data based on indexing the set of key portions of the audio data to respective mapped video frames of the video data.

4. The apparatus of claim 3, the first or the second keyframe index and the third keyframe index comprising the same keyframe index.

5. The apparatus of claim 1, the keyframe indexing module operative on the processor circuit to:
generate an updated first or second keyframe index by storing a set of manually entered changes to the respective first or second keyframe indexes; and
modify a procedure to identify third key portions of third non-audio sensor data captured during recording of a second event according to the manually entered changes.

6. The apparatus of claim 5, the keyframe indexing module operative on the processor circuit to:
identify missing keyframes of the first or the second keyframe index, the missing keyframes comprising keyframes of the first or the second keyframe index that are not present in the updated first or updated second keyframe index; and
assign the missing keyframes as false-positive classification errors.

7. The apparatus of claim 5, the keyframe indexing module operative on the processor circuit to:
identify new keyframes of the first or the second keyframe index, the new keyframes comprising keyframes of the updated first or updated second keyframe index that are not present in the first or the second keyframe index; and
assign the new keyframes as false-negative classification errors.

8. The apparatus of claim 1, the keyframe indexing module operative on the processor circuit to identify the one or more first or second key portions of the first or second non-audio sensor data by:
assigning a respective first or second key portion to first or second non-audio sensor data within an interval in which a value of first or second non-audio sensor data vs. time changes sign.

9. At least one non-transitory computer-readable storage medium comprising instructions that, when executed, cause a system to:
map first non-audio sensor data from a first sensor to video data, the first non-audio sensor data and video data corresponding to an event;
identify one or more first key portions of the first non-audio sensor data based on a change in one or more successive data values of the first non-audio sensor data that exceeds a first threshold change value, to identify the one or more first key portions includes:
monitoring first non-audio sensor data as a function of time; and
assigning a first key portion to first non-audio sensor data within an interval in which a value of first non-audio sensor data vs. time or rate of change of the value of first non-audio sensor data vs. time deviates from another value of first non-audio sensor data vs. time or rate of change of the other first non-audio sensor data vs. time in an immediately prior interval by the first threshold change value;
index the one or more first key portions to respective mapped one or more first video frames of the video data;
generate a first keyframe index to identify the one or more first video frames;
map second non-audio sensor data from a second sensor to the video data, the second non-audio sensor data corresponding to the event;
identify one or more second key portions of the second non-audio sensor data based on a change in one or more successive data values of the second non-audio sensor data that exceeds a second threshold change value, to identify the one or more second key portions includes:
monitoring second non-audio sensor data as a function of time; and
assigning a second key portion to second non-audio sensor data within an interval in which a value of second non-audio sensor data vs. time or rate of change of the value of second non-audio sensor data vs. time deviates from another value of second non-audio sensor data vs. time or rate of change of the other second non-audio sensor data vs. time in an immediately prior interval by the second threshold change value;
index the one or more second key portions of the second non-sensor data to respective mapped one or more second video frames of the video data; and
generate a second keyframe index to identify the one or more second video frames.

10. The at least one non-transitory computer-readable storage medium of claim 9, the first or second non-audio sensor data comprising data recorded by an accelerometer, a gyrometer, a pressure sensor, a temperature sensor, a light sensor, or a humidity sensor.

11. The at least one non-transitory computer-readable storage medium of claim 9 comprising instructions that, when executed, cause a system to:
map audio data to the video data, the audio data and video data captured during recording of the event;
identify key portions of the audio data; and
generate a third keyframe index identifying one or more video frames of the video data based on indexing the set of key portions of the audio data to respective mapped video frames of the video data.

12. The at least one non-transitory computer-readable storage medium of claim 11, the first or the second keyframe index and the third keyframe index comprising the same keyframe index.

13. The at least one non-transitory computer-readable storage medium of claim 9 comprising instructions that, when executed, cause a system to:
generate an updated first or second keyframe index by storing a set of manually entered changes to the respective first or second keyframe indexes; and
modify a procedure to identify third key portions of third non-audio sensor data captured during recording of a second event according to the manually entered changes.

14. The at least one non-transitory computer-readable storage medium of claim 13 comprising instructions that, when executed, cause a system to:
identify missing keyframes of the first or the second keyframe index, the missing keyframes comprising keyframes of the first or the second keyframe index that are not present in the updated first or updated second keyframe index; and
assign the missing keyframes as false-positive classification errors.

15. The at least one non-transitory computer-readable storage medium of claim 13 comprising instructions that, when executed, cause a system to:
identify new keyframes of the first or the second keyframe index, the new keyframes comprising keyframes of the updated first or updated second keyframe index that are not present in the first or the second keyframe index; and
assign the new keyframes as false-negative classification errors.

16. The at least one non-transitory computer-readable storage medium of claim 9 comprising instructions that, when executed, cause a system to identify the one or more first or second key portions of the first or second non-audio sensor data by:
assigning a respective first or second key portion to first or second non-audio sensor data within an interval in which a value of first or second non-audio sensor data vs. time changes sign.

17. A computer implemented method, comprising:
mapping first non-audio sensor data from a first sensor to video data, the first non-audio sensor data and video data corresponding to an event;
identifying one or more first key portions of the first non-audio sensor data based on a change in one or more successive data values of the first non-audio sensor data that exceeds a first threshold change value, identifying the one or more first key portions includes:
monitoring first non-audio sensor data as a function of time; and
assigning a first key portion to first non-audio sensor data within an interval in which a value of first non-audio sensor data vs. time or rate of change of the value of first non-audio sensor data vs. time deviates from another value of first non-audio sensor data vs. time or rate of change of the other first non-audio sensor data vs. time in an immediately prior interval by the first threshold change value;
indexing the one or more first key portions to respective mapped one or more first video frames of the video data;
generating a first keyframe index to identify the one or more first video frames;
mapping second non-audio sensor data from a second sensor to the video data, the second non-audio sensor data corresponding to the event;
identifying one or more second key portions of the second non-audio sensor data based on a change in one or more successive data values of the second non-audio sensor data that exceeds a second threshold change value, to identify the one or more second key portions includes:
monitoring second non-audio sensor data as a function of time; and
assigning a second key portion to second non-audio sensor data within an interval in which a value of second non-audio sensor data vs. time or rate of change of the value of second non-audio sensor data vs. time deviates from another value of second non-audio sensor data vs. time or rate of change of the other second non-audio sensor data vs. time in an immediately prior interval by the second threshold change value;
indexing the one or more second key portions of the second non-sensor data to respective mapped one or more second video frames of the video data; and
generating a second keyframe index to identify the one or more second video frames.

18. The computer implemented method of claim 17, the first or second non-audio sensor data comprising data recorded by an accelerometer, a gyrometer, a pressure sensor, a temperature sensor, a light sensor, or a humidity sensor.

19. The computer implemented method of claim 17, comprising:
mapping audio data to the video data, the audio data and video data captured during recording of the event;
identifying key portions of the audio data; and
generating a third keyframe index identifying one or more video frames of the video data based on indexing the set of key portions of the audio data to respective mapped video frames of the video data.

20. The computer implemented method of claim 19, the first or the second keyframe index and the third keyframe index comprising the same keyframe index.

21. The computer implemented method of claim 17, comprising:
generating an updated first or second keyframe index by storing a set of manually entered changes to the respective first or second keyframe indexes; and
modifying a procedure to identify third key portions of third non-audio sensor data captured during recording of a second event according to the manually entered changes.

22. The computer implemented method of claim 21, comprising:
identifying missing keyframes of the first or the second keyframe index, the missing keyframes comprising keyframes of the first or the second keyframe index that are not present in the updated first or updated second keyframe index; and
assigning the missing keyframes as false-positive classification errors.

23. The computer implemented method of claim 21, comprising:
identifying new keyframes of the first or the second keyframe index, the new keyframes comprising keyframes of the updated first or updated second keyframe index that are not present in the first or the second keyframe index; and
assigning the new keyframes as false-negative classification errors.

24. The computer implemented method of claim 17, comprising identifying the one or more first or second key portions of the first or second non-audio sensor data by:
assigning a respective first or second key portion to first or second non-audio sensor data within an interval in which a value of first or second non-audio sensor data vs. time changes sign.

* * * * *